United States Patent Office 3,776,943
Patented Dec. 4, 1973

3,776,943
4-(AND 5-) LOWERALKOXYCARBONYLAMINO-1-NAPHTHYL-N-LOWERALKYLCARBAMATES
Louis H. Peterson, Woodbridge, and Edward F. Rogers, Middleton, N.J., assignors to Merck & Co., Inc., Rahway, N.J.
No Drawing. Filed Sept. 25, 1970, Ser. No. 75,656
Int. Cl. C07c 125/06
U.S. Cl. 260—471 C                 6 Claims

ABSTRACT OF THE DISCLOSURE

Naphthyl-N-loweralkylcarbamates having the formulae:

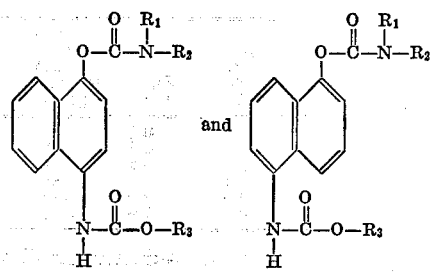

wherein $R_1$ and $R_2$ are members selected from the group consisting of loweralkyl having from 1 to 2 carbon atoms and $R_3$ is a member selected from the group consisting of loweralkyl having from 1 to 6 carbon atoms are prepared from 4- or 5-amino-1-naphthol and display activity as insecticides, as plant nematocides and as fruit thinning agents.

This invention relates to new compositions of matter classifiable in the field of organic chemistry as naphthyl-N-loweralkylcarbamates. More particularly, this invention relates to 4- (and 5-) loweralkoxycarbonylamino-1-naphthyl-N-loweralkylcarbamates; to methods for preparing these compounds; and to methods for employing them as insecticides, as plant nematocides and as fruit thinning agents.

In its composition aspect, therefore, the instant invention may be described as residing in the concept of naphthyl-N-loweralkylcarbamates having the formulae:

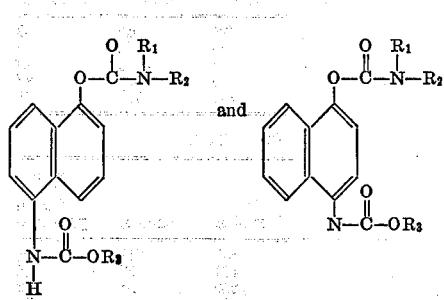

wherein $R_1$ and $R_2$ are members selected from the group consisting of loweralkyl having from 1 to 2 carbon atoms (i.e. methyl or ethyl) and $R_3$ is a member selected from the group consisting of loweralkyl, both straight and branched chain, having from 1 to 6 carbon atoms. Typical of the loweralkyl groups embraced by the symbol $R_3$ are, for example, methyl, ethyl, propyl, isopropyl, n-butyl, isobutyl, n-hexyl, and the like.

The instant invention is based upon applicants' discovery that the naphthyl-N-loweralkylcarbamates of this invention possess inherent applied use characteristics as insecticides, as plant nematocides and as fruit thinning agents, particularly for apples. The biological activity of these naphthyl-N-loweralkylcarbamates has been confirmed by standard laboratory and field techniques. It is contemplated, therefore, that formulations such as powders, dusts and sprays containing the naphthyl-N-loweralkyl carbamates of this invention as the essential active ingredient will be employed as insecticides, as plant nematocides and as fruit thinning agents.

The naphthyl-N-loweralkylcarbamates of this invention may be prepared readily from conventional and well-known starting materials. Both the 4- and 5-loweralkoxycarbonylamino isomers may be prepared by employing as the starting material 4- or 5-amino-1-naphthol. As the first step in the synthesis, the 4- or 5-amino-1-naphthol is treated with benzaldehyde to form the corresponding 4- or 5-benzylideneaminonaphthol. The reaction conveniently is carried out by heating on a steam bath a mixture of the 4- or 5-aminonaphthol (preferably as the hydrochloride) and benzaldehyde in an aqueous alcoholic solvent and in the presence of a base such as an alkali metal hydroxide, an alkali metal alkoxide or an alkali metal salt of a loweralkanoic acid. The reaction usually is complete in from ten to thirty minutes and the product may be recovered from the reaction mixture by filtration and purified by conventional recrystallization from a suitable organic solvent such as acetone, ether or hexane.

The 4- or 5-benzylideneaminonaphthol so produced then may be treated so as to introduce the loweralkylcarbamate or diloweralkylcarbamate group at the 1-position thus forming the corresponding O-(4- or 5-benzylideneaminonaphthyl)-N-loweralkyl (or diloweralkyl)carbamate. The N-loweralkyl carbamate group may be introduced by treating the 4- or 5-benzylidineaminonaphthol with methyl or ethyl isocyanate. This reaction may be carried out at room temperature by stirring the benzylidineaminonaphthol in a suitable organic solvent, such as acetone or hexane, with the isocyanate for ten to thirty minutes. After concentrating the reaction mixture, the product may be separated by filtration and purified by recrystallization from an organic solvent such as ethyl acetate, aqueous ethyl acetate, acetone, hexane or ether.

Where a diloweralkyl carbamate group is desired at the 1-position, the 4- or 5-benzylideneaminonaphthol may be treated with a diloweralkylcarbamoyl halide, preferably the chloride, wherein the loweralkyl moieties contain from 1 to 2 carbon atoms. The reaction may be carried out at room temperature by stirring from 12 to 20 hours a solution of the benzylidineaminonaphthol and the carbamoyl chloride in a suitable organic solvent such as pyridine. The product may be separated by filtration after pouring the reaction mixture into ice water. Purification may be achieved by conventional recrystallization.

The next step in the synthesis, involves acid hydrolysis of the O-(4- or 5-benzylideneaminonaphthyl)-N-loweralkyl (or diloweralkyl) carbamate intermediate to remove the benzylidene group and prepare the corresponding O-(4- or 5-aminonaphthyl)-N-loweralkyl (or diloweralkyl) carbamate. Conveniently, the reaction is carried out by dissolving the O-(benzylideneaminonaphthyl)-N-loweralkyl (or diloweralkyl) carbamate in a suitable organic solvent such as methanol, ether, benzene and the like and treating the solution with dilute mineral acid such as hydrochloric acid. The product, which is usually isolated as the acid addition salt, may be recovered from the reaction mixture by extraction with water. The residue, after concentration the aqueous extract may be purified by conventional recrytallization from methanol, ether, hexane, acetone and the like.

Finally, the loweralkoxycarbonylamino group may be introduced at the 4- or 5-position by treating the O-(4- or 5-aminonaphthyl)-N-loweralkyl (or diloweralkyl) carbamate obtained above with any desired loweralkyl haloformate, preferably the chloroformate. A solution of the O-(aminonaphthyl)-N-loweralkyl (or diloweralkyl) carbamate in a suitable organic solvent, such as acetone, aqueous acetone, benzene or the like, usually is ice cooled and the loweralkyl haloformate is slowly added with stirring. The reaction usually is complete in fifteen to sixty minutes and the 4- or 5-loweralkoxycarbonylamino-1-naphthyl-N-loweralkyl (or diloweralkyl) carbamate so produced may be separated from the reaction mixture by filtration and purified by conventional recrystallization.

When employed as insecticides and as plant nematocides, the naphthyl-N-loweralkylcarbamates of this invention may be incorporated into pesticidal compositions in any of the usual ways either with or without wetting agents and inert diluents. Those compositions can be liquid or solid-dust form, the liquid form including emulsions. Such compositions can be formulated so as to contain from about 0.001% to about 50% of the active carbamate depending upon whether the composition is to be used as a concentrate or as an end use composition. For end use, the composition conveniently are formulated so as to contain about 0.001% to about 1.0% of the active carbamate.

Typcial inert diluents with which the naphthyl-N-loweralkylcarbamates of this invention may be incorporated include, for example, clays, sands, talc, mica, fertilizers and the like, such compositions being in the form of dusts or larger particle size materials. Also, the naphthyl-N-loweralkylcarbamates of this invention may be dissolved in a water immiscible solvent, such as for example, a high boiling hydrocarbon, desirably containing also emulsifying and wetting agents, which compositions act as self-emulsifiable oils upon the addition of water. Typical emulsifying agents and wetting agents which may be employed in compounding either liquid or solid pesticidal formulations containing the active carbamates of this invention include, for example anionic compounds such as soaps, fatty sulfate esters and fatty aromatic sulfonates; nonionic wetting agents such as condensation products of fatty acids, fatty alcohols or fatty substituted phenols with ethylene oxide, or fatty esters of sugars or polyhydric alcohols, or block copolymers of ethylene oxide and propylene oxide; and cationic agents such as, for example, cetyl trimethylammonium bromide and the like.

As indicated above, the naphthyl-N-loweralkylcarbamates of this invention also may be used as fruit (blossom) thinning agents, particularly for apples. When used for this purpose, liquid or solids dust formulations sitmilar to those described above may be employed, liquid sprayable formulations being preferred. These formulations also may contain from about 0.001% to about 50% of the active carbamate depending upon whether the formulation is to be used as a concentrate or as an end use formulation. For end use the formulation usually contain from 100 to 400 p.p.m. of the active carbamate. For best results, application of formulations containing the active carbamates of this invention is made to the fruit trees at 15 to 30 days after full bloom.

The best mode contemplated by applicants for carrying out their invention is illustrated in the following examples, no limitation, however, being intended except as set forth in the appended claims.

EXAMPLE 1

5-methoxycarbonylamino-1-naphthyl-N-methylcarbamate (A) 5-benzylideneamino-1-naphthol: Stir 34 gm. of 5-amino-1-naphthol in 100 ml. of methanol and 400 ml. of methanol and 400 ml. of water and add slowly 100 ml. of 2 N hydrochloric acid. Heat the mixture on a steam bath and add 25 ml. of benzaldehyde followed by a solution of 29 gm. of sodium acetate in 90 ml. of water. Continue stirring for 15 minutes and filter. Wash the filter cake three times with water. Dissolve the filter cake ether and filter. Wash the filtrate with saturated aqueous sodium chloride; dry over magnesium sulfate; charcoal and filter. Concentrate the filtrate to small volume; cool and separate the product by filtration. Recrystallize from ethylacetate to obtain 5-benzylideneamino-1-naphthol (M.P. 174–175° C.).

(B) O-(5 - benzylideneaminonaphthyl)-N-methylcarbamate: Dissolve 2.47 gm. of 5-benylideneamino-1-naphthol in 20 ml. of acetone containing two drops of triethylamine and add 0.75 ml. of methyl isocyanate. Stir at room temperature for 20 minutes. Evaporate the reaction mixture to dryness and warm the residue in ether, filter and wash with fresh ether. Recrystallize from ethyl acetate to obtain O - (5 - benzylideneaminonaphthyl)-N-methylcarbamate (M.P. 164–165° C.)

(C) O-(5 - aminonaphthyl)-N-methylcarbamate hydrochloride; Dissolve 500 mg. of O-(5-benzylideneaminonaphthyl)-N-methylcarbamate in methanol diluted with ether and add 1.0 ml. of 2 N hydrochloric acid. Extract the reaction mixture four times with water and combine the extracts. Wash the combined extract with ether and concentrate the extract to a residue. Take up the residue in ethanol and benzene and evaporate to dryness. Wash the residue with acetone and recrystallize from methanol-ether to obtain O-(5-aminonaphthyl)-N-methylcarbamate hydrochloride (M.P. 220° C.—darkened).

(D) 5 - methoxycarbonylamino - 1 - naphthyl-N-methyl carbamate: To an ice cooled solution of 500 mg. of O-(5-aminonaphthyl)-N-methylcarbamate hydrochloride in 10 ml. of 50% aqueous acetone, add with stirring 0.4 ml. of methyl chloroformate followed by 6 ml. of 10% aqueous sodium bicarbonate. Continue stirring for 15 minutes after addition is complete. Separate the product by fitration and wash with water. Recrystallize from ethyl acetate to obtain 5-methoxycarbonylamino-1-naphthyl-N-methylcarbamate (M.P. 198–199° C.—dec.).

Quite obviously, ethyl isocyanate may be substituted in step B, above, for the methyl isocyanate to insert the corresponding ethyl carbamate group at the 1-position. Thus 4- or 5-benzylidineamino-1-naphthol may be treated with ethyl isocyanate to obtain O-(4- or 5-benzylideneaminonaphthyl)-N-ethylcarbamate.

Further, any desired loweralkyl haloformate may be substituted for the methyl chloroformate in step D, above, in order to form the corresponding loweralkoxycarbonylamino group at the 4- or 5-position. Thus, O-(4- or 5-aminonaphthyl)-N-methylcarbmate or O-(4- or 5-aminonaphthyl)-N-ethylcarbamate may be treated with ethyl chloroformate, propyl chloroformate or isopropyl chloroformate to form 4- or 5-ethoxycarbonylamino-1-naphthyl-N-methylcarbamate,
4- or 5-propoxycarbonylamino-1-naphthyl-N-methylcarbamate,
4- or 5-isopropoxycrabonylamino-1-naphthyl-N-methylcarbamate,
4- or 5-ethoxycarbonylamino-1-naphthyl-N-ethylcarbamate,
4- or 5-propoxycarbonylamino-1-naphthyl-N-ethylcarbamate or
4- or 5-isopropoxycarbonylamino-1-naphthyl-N-ethylcarbamate, respectively.

EXAMPLE 2

4-methoxycarbonylamino-1-naphthyl-N-methylcarbamate

Dissolve 9.8 gm. of 4-amino-1-naphthol hydrochloride in 25 ml. of methanol and 100 ml. of water and heat the solution on a steam bath. Add 7.5 gm. of sodium acetate in 25 ml. of water. Stir the mixture for 10 minutes and cool. Separate the aqueous phase and extract with methylene chloride. Wash the methylene chloride extract with water and with saturated aqueous sodium chloride. Dry the washed extract over magnesium sulfate. Add to the extract 5 drops of triethylamine and 3 ml. of methyl isocyanate. Stir for 20 minutes and shake with 100 ml. of 0.5 N hydrochloric acid. Filter and concentrate the filtrate to a small volume. Dilute the concentrate with methanol and shake again with hydrochloric acid. Wash the acid solution with methylene chloride and concentrate to a residue. Take the residue up in methanol and again concentrate to a residue pumping dry. Recrystallize from methanol-ether and then from methanol-ethyl-acetate. Dissolve 500 mg. of recrystallized material in 10 ml. of ice cooled 50% aqueous acetone and add 0.5 ml. of methyl chloroformate followed by 6 ml. of 10% aqueous sodium bicarbonate. Stir for 20 minutes, separate the product by filtration and wash with water, with methanol and with ether. Recrystallize from methanol-ethyl acetate to obtain 4-methoxycarbonylamino-1-naphthyl-N-methylcarbamate (M.P. 179–181° C.).

EXAMPLE 3

4-ethoxycarbonylamino-1-naphthyl-N-methylcarbamate

Repeat the process of Example 2 substituting an equivalent quantity of ethyl chloroformate for the methyl chloroformate, to obtain 4-ethoxycarbonylamino-1-naphthyl-N-methylcarbamate (M.P. 170–171.5° C.).

EXAMPLE 4

4-isopropoxycarbonylamino-1-napththyl-N-methylcarbamate

Repeat the process of Example 2 substituting an equivalent quantity of isopropyl chloroformate for the methyl chloroformate to obtain 4-isopropoxycarbonylamino-1-naphthyl-N-methylcarbamate (M.P. 165.5–167.5° C.).

EXAMPLE 5

5-isopropoxycarbonylamino-1-naphthyl-N-methylcarbamate

Repeat the process of Example 2 substituting an equivalent quantity of 5-amino-1-naphthol for the 4-amino-1-naphthol and an equivalent quantity of isopropyl chloroformate for the methyl chloroformate to obtain 5-isopropoxycarbonylamino - 1 - naphthyl-N-methylcarbamate (M.P. 201–206° C.).

EXAMPLE 6

5-methoxycarbonylamino-1-naphthyl-N-ethylcarbamate

Repeat the process of Example 2 substituting an equivalent quantity of 5-amino-1-naphthol for the 4-amino-1-naphthol and an equivalent quantity of ethyl isocyanate for the methyl isocyanate to obtain 5-methoxycarbonylamino-1-naphthyl-N-ethylcarbamate.

EXAMPLE 7

5-methoxycarbonylamino-1-naphthyl-N,N-dimethylcarbamate (A) O - (5-benzylideneaminonaphthyl)-N-N-dimethylcarbamate: To a solution of 3.33 gm. of 5-benzylidene-1-naphthol, prepared according to Example 1(A), in 30 ml. of pyridine add with stirring 1.0 ml. of dimethyl carbamoyl chloride. Stir the mixture for 16 hours at room temperature and then pour into ice water. Extract with methylene chloride, wash the extract with water and dry over magnesium sulfate. Concentrate the extract to a residue. Recrystallize from ethyl acetate to obtain O-(5-benzylideneaminonaphthyl)-N,N-dimethylcarbamate.

(B) O-(5-aminonaphthyl) - N,N - dimethylcarbamate hydrochloride: Add 1.5 ml. of 2 N hydrochloric acid to a solution of 500 mg. of O-(5-benzylideneaminonaphthyl)-N,N-dimethylcarbamate in ethanol diluted with ether. Stir for 10 minutes. Extract the reaction mixture four times with water and combine the extracts. Wash the combined extracts with ether and concentrate to a residue. Take up the residue in ethanol-benzene and evaporate to dryness. Wash the residue with acetone and recrystallize from methanol-ether to obtain (O-(5-aminonaphthyl)-N,N-dimethylcarbamate hydrochloride.

(C) 5-methoxycarbonylamino - 1 - naphthyl-N,N-dimethylcarbamate: Add to an ice cooled solution of 500 mg. of O-(5-aminonaphthyl)-N,N-dimethylcarbamate hydrochloride in 10 ml. of aqueous acetone 0.5 ml. of methyl chloroformate. Stir for 20 minutes after addition is complete. Separate the product by filtration and wash with water. Recrystallize from ethyl acetate to obtain 5-methoxycarbonylamino-1-naphthyl - N,N - dimethylcarbamate.

Any desired diloweralkyl carbamoyl halide having from 1 to 2 carbon atoms in the alkyl moieties can be substituted for the dimethyl carbamoyl chloride employed in step A above in order to introduce the corresponding diloweralkylcarbamate group at the 1-position. Thus, for example, 4- or 5-benzylidene-1-naphthol may be treated with N,N-diethyl carbamoyl chloride or with N-methyl-N-ethyl carbamoyl chloride to obtain O-(4- or 5-benzylideneaminonaphthyl)-N,N-diethylcarbamate and O - (4- or 5 - benzylideneaminonaphthyl)-N-methyl-N-ethylcarbamate.

Also, the methylchloroformate employed in step C above may be replaced with an equivalent quantity of any desired loweralkyl haloformate in order to introduce the corresponding loweralkoxycarbonylamino group at the 4- or 5-position. Thus, for example, O-(4- or 5-aminonaphthyl) - N,N - dimethylcarbamate, O-(4- or 5-aminonaphthyl) - N,N - diethylcarbamate or O-(4- or 5-aminonaphthyl)-N-methyl-N-ethylcarbamate may be treated with ethyl chloroformate, propyl bromoformate, or isopropyl chloroformate to form 4- or 5-ethoxycarbonylamino-1-naphthyl-N,N-dimethylcarbamate,
4- or 5-propoxycarbonylamino-1-naphthyl-N,N-dimethylcarbamate,
4- or 5-isopropoxycarbonylamino-1-naphthyl-N,N-dimethylcarbamate,
4- or 5-ethoxycarbonylamino-1-naphthyl-N,N-diethylcarbamate,
4- or 5-propoxycarbonylamino-1-naphthyl-N,N-diethylcarbamate,
4- or 5-isopropoxycarbonylamino-1-naphthyl-N,N-diethyl carbamate,
4- or 5-ethoxycarbonylamino-1-naphthyl-N-methyl-N-ethylcarbamate,
4- or 5-propoxycarbonylamino-1-naphthyl-N-methyl-N-ethylcarbamate and
4- or 5-isopropoxycarbonylamino-1-naphthyl-N-methyl-N-ethylcarbamate, respectively.

The subject matter which applicants regard as their invention is particularly pointed out and distinctly claimed as follows.

What is claimed is:

1. A compound selected from the group consisting of naphthyl-N-loweralkylcarbamates having the formulae:

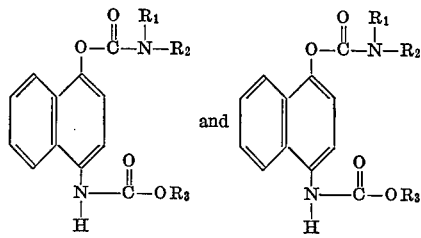

wherein $R_1$ and $R_2$ are members selected from the group consisting of loweralkyl having from 1 to 2 carbon atoms and $R_3$ is a member selected from the group consisting of loweralkyl having from 1 to 6 carbon atoms.

2. A compound of claim 1 which is 4-ethoxycarbonylamino-1-naphthyl-N-methylcarbamate.

3. A compound of claim 1 which is 4-isopropoxycarbonylamino-1-naphthyl-N-methylcarbamate.

4. A compound of claim 1 which is 5-isoproxycarbonylamino-1-naphthyl-N-methylcarbamate.

5. A compound of claim 1 which is 5-methoxycarbonylamino-1-naphthyl-N-methylcarbamate.

6. A compound of claim 1 which is 4-methoxycarbonylamino-1-naphthyl-N-methylcarbamate.

References Cited

UNITED STATES PATENTS

| | | | |
|---|---|---|---|
| 3,252,986 | 5/1966 | Gapekar | 260—471 C |
| 3,308,019 | 3/1967 | Hopf et al. | 260—471 C |
| 3,457,296 | 7/1969 | Olin | 260—471 C |

LORRAINE A. WEINBERGER, Primary Examiner

L. A. THAXTON, Assistant Examiner

U.S. Cl. X.R.

71—111; 424—300